United States Patent
Kim et al.

(10) Patent No.: US 12,001,682 B2
(45) Date of Patent: Jun. 4, 2024

(54) PIM COMPUTING SYSTEM AND MEMORY CONTROLLER THEREOF

(71) Applicants: SK hynix Inc., Icheon (KR); KOREA UNIVERSITY RESEARCH AND BUSINESS FOUNDATION, Seoul (KR)

(72) Inventors: Seon Wook Kim, Namyangju (KR); Chang Hyun Kim, Seongnam (KR); Won Joon Lee, Seongnam (KR)

(73) Assignees: SK hynix Inc., Icheon (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 13 days.

(21) Appl. No.: 18/068,995

(22) Filed: Dec. 20, 2022

(65) Prior Publication Data

US 2023/0418474 A1 Dec. 28, 2023

(30) Foreign Application Priority Data

Jun. 24, 2022 (KR) .................. 10-2022-0077390

(51) Int. Cl.
*G06F 3/06* (2006.01)
(52) U.S. Cl.
CPC .......... *G06F 3/0613* (2013.01); *G06F 3/0659* (2013.01); *G06F 3/0673* (2013.01)
(58) Field of Classification Search
CPC ..... G06F 3/0613; G06F 3/0659; G06F 3/0673
See application file for complete search history.

(56) References Cited

U.S. PATENT DOCUMENTS

| 2006/0274078 | A1* | 12/2006 | Chung | G06T 15/04 345/582 |
|---|---|---|---|---|
| 2018/0157441 | A1 | 6/2018 | Bains et al. | |
| 2021/0350837 | A1* | 11/2021 | Song | G11C 11/409 |
| 2022/0197647 | A1* | 6/2022 | Kayiran | G06F 12/0284 |
| 2023/0223065 | A1* | 7/2023 | Kang | G06F 13/1631 365/145 |

FOREIGN PATENT DOCUMENTS

KR 1020060116916 A 11/2006

OTHER PUBLICATIONS

Chan Kim et al, Silent-PIM: Realizing the Processing-in-Memory Computing With Standard Memory Requests, 2021, IEEE (Year: 2021).*

Young Lee et al, Quant-PIM: An Energy-efficient Processing-in-memory Accelerator for Layer-wise Quantized Neural Networks, Jan. 2021, IEEE (Year: 2021).*

* cited by examiner

Primary Examiner — Ryan Bertram (57) ABSTRACT

A Processing-in-Memory (PIM) computing system and a memory controller provide improved memory traffic efficiency and improved PIM operation efficiency by increasing a burst length of a PIM operation relative to a general memory request. In embodiments, the increased burst length allows the PIM operation to be performed in units of pages, wherein a page is management unit of a memory used in the PIM operation.

22 Claims, 10 Drawing Sheets

| ① | ② | Same bank | Different bank |
|---|---|---|---|
| RD | RD | tCCD | tCCD |
| RD | WR | tRL+tBL+2-tWL | |
| RD | PRE | tRTP | X |

Fig. 6

| ① | ② | | Same bank | Different bank |
|---|---|---|---|---|
| PIM RD | RD | | tCCD_PIM | X |
| | PIM RD | | | |
| | WR | | tCCD_PIM + (tRL+tBL+2-tWL) | |
| | PIM WR | | | |
| | PRE | | tCCD_PIM + tRTP | X |

PIM COMPUTING SYSTEM AND MEMORY CONTROLLER THEREOF

CROSS-REFERENCE TO RELATED APPLICATION

This application claims priority under 35 U.S.C. § 119 to Korean Patent Application No. 10-2022-0077390 filed on Jun. 24, 2022, which is incorporated herein by reference in its entirety.

BACKGROUND

1. Field

Embodiments relate to a processing-in-memory (PIM) computing system, and more particularly, to a PIM computing system configuring a burst length for an efficient PIM operation and a memory controller thereof.

2. Discussion of the Related Art

A central processing unit (CPU) of a system using a semiconductor memory may read codes or data stored in the semiconductor memory, may execute a designated program, and may store a result thereof in the semiconductor memory. An example of the semiconductor memory may include a Dynamic Random Access Memory (DRAM).

Recently, a semiconductor memory has been developed having a processing-in-memory (PIM) operation function. The PIM operation function is a function that performs an operation inside the semiconductor memory in order to prevent congestion occurring during data movement, such as may occur in the machine learning, high-performance computing, and big data processing fields.

A system using the semiconductor memory having a PIM operation function may be referred to as a PIM computing system.

A CPU may transmit a memory request to a memory controller through a cache hierarchy, and the memory controller may transmit the memory request to a memory.

The memory controller is used as a slave device for processing a request requested by the CPU. For efficient operation, the read granularity of a memory corresponding to the memory request from the CPU may be determined by the cache-line size of the cache hierarchy. The cache-line size may be, for example, 64 bytes.

A memory request may be classified into a general memory request for performing a memory operation for the memory (such as transferring data between the CPU and memory) or a PIM request for performing a PIM operation using the memory.

Unlike the general memory request, the PIM request performs a PIM operation inside the DRAM. Therefore, it may be inefficient to apply the read granularity of the general memory request, determined according to the cache-line size outside the memory, to the PIM operation of the PIM request.

That is, a need exists to improve the efficiency of the PIM operation while improving memory traffic for the PIM request by increasing the read granularity for the PIM operation.

SUMMARY

Various embodiments are directed to providing a PIM computing system capable of improving the efficiency of a PIM operation while improving memory traffic for a PIM request, and a memory controller thereof.

Various embodiments are directed to providing a PIM computing system that applies an increased burst length to a PIM request for a PIM operation between a general memory request and the PIM request and can serve both the general memory request and the PIM request, and a memory controller thereof.

Various embodiments are directed to providing a PIM computing system capable of securing the efficiency of a PIM operation and improving memory traffic by applying a different read granularity of a DRAM for a general memory request and a PIM request for a PIM operation, and a memory controller thereof.

Various embodiments are directed to providing a PIM computing system that applies a burst length considering a cache-line size to a general memory request and applies a burst length increased in page units to a PIM request for a PIM operation in order to improve memory traffic, and a memory controller thereof.

A PIM computing system of the present disclosure may include: a memory controller configured to identify a memory request and a PIM request by comparing an address of the memory request with pre-registered PIM address information, and to schedule the PIM request by applying a second burst length greater than a first burst length applied to the memory request; and a DRAM configured to perform a PIM operation of reading data of a second read granularity corresponding to the second burst length when a PIM read request for a read command is received.

A memory controller of a PIM computing system of the present disclosure may include: a PIM interface unit configured to receive memory requests, to compare an address requested by the memory request with pre-registered PIM address information, and to provide a PIM request identification signal obtained by identifying whether the memory request corresponds to a PIM request; a request queue unit configured to receive the memory requests, and to transmit the memory request and the PIM request identification signal of the PIM interface unit; and a scheduler configured to apply a second burst length, which is greater than a first burst length applied to the memory request, to a PIM read request for a read command when the PIM request is identified as the PIM read request by the PIM request identification signal, and to schedule transmission of the memory request and the PIM request.

The present disclosure has the effect of providing a scheduling scheme capable of simultaneously supporting a memory request and a PIM request.

The present disclosure has the effect capable of efficiently improving a PIM operation while improving memory traffic for a PIM request by increasing a burst length for the PIM request.

The present disclosure has the effect capable of variously configuring a burst length with respect to a PIM request and thus having scalability for use in various specifications of DRAMs and operating systems.

DETAILED DESCRIPTION

Hereinafter, preferred embodiments of the present disclosure will be described in detail with reference to the accompanying drawings. The terms used in this specification and claims are not interpreted as being limited to typical or dictionary definitions, but should be interpreted as meanings and concepts which coincide with the technical idea of the present disclosure.

Embodiments described in this specification and configurations illustrated in the drawings are illustrative embodiments of the present disclosure, and do not represent the entire technical idea of the present disclosure. Thus, various equivalents and modifications capable of replacing the embodiments and configurations may be provided at the time of filing the present application. For example, elements of embodiments described as a "unit" may be implemented using one or more electronic circuits, and/or one or more of such units may be implemented using a single electronic circuits.

Figure 1:
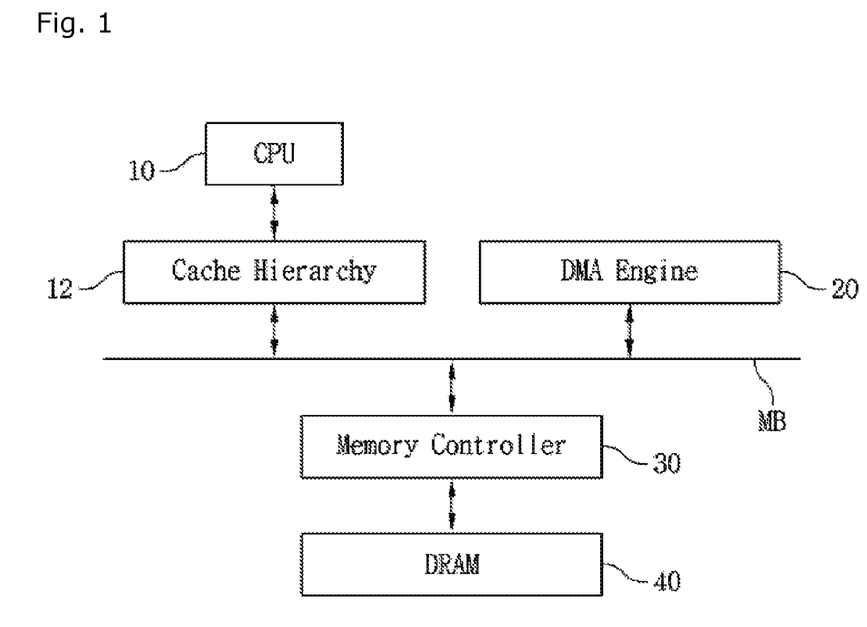
FIG. 1 is a block diagram of an embodiment of a PIM computing system of the present disclosure.

Referring to FIG. 1, an embodiment of a PIM computing system of the present disclosure may include a CPU 10, a Cache Hierarchy 12, a DMA Engine 20, a Memory Controller 30, and a DRAM 40. Although the embodiment will be described in terms of DRAM, embodiments are not limited thereto, and may include DRAM, static random access memory, non-volatile read-write memory, and combinations thereof.

A memory bus MB is configured to provide an interface between the Cache Hierarchy 12, the DMA Engine 20, and the Memory Controller 30.

In general, the CPU 10 may be configured to read codes or data stored in the DRAM 40, execute a designated program, and store the result of the execution in the DRAM 40.

The Cache Hierarchy 12 is configured to temporarily store data of the CPU 10 inputted/outputted through the memory bus MB, and the amount of data for an input/output operation of the CPU 10 may be limited by a cache-line size of the Cache Hierarchy 12, that is, a cache capacity.

In the embodiment of the PIM computing system of the present disclosure, the CPU 10 may be configured to provide a memory request to the DRAM 40 to control an operation to be performed (such as a PIM operation), the DMA Engine 20 may be configured by the CPU 10 to provide an offloaded memory request to control the DRAM 40 to perform a PIM operation, or both.

The DMA Engine 20 may generate, for example, a transaction corresponding to an offloaded memory request for machine learning, high-performance computing, and big data processing fields, and control the PIM operation of the DRAM 40 independent of the CPU 10.

As described above, a memory request may be classified as one from the CPU 10 to request the DRAM 40 to perform memory processing in order to perform an operation, or as one from the DMA Engine 20 to control the PIM operation inside the DRAM 40.

The above-described memory request for a PIM operation may be defined as a PIM request to be distinguished from a general memory request.

The Memory Controller 30 receives an external memory request through the MB, identifies whether the memory request is a general memory request or a PIM request, and schedules the general memory request or the PIM request to the DRAM 40.

The CPU 10 may pre-register PIM address information for identifying the PIM request in the Memory Controller 30 and the DRAM 40. The Memory Controller 30 and the DRAM 40 may identify whether the memory request is a PIM request by using the PIM address information registered as described above.

More specifically, the Memory Controller 30 may identify a memory request as a PIM request by comparing an address requested by the memory request with the pre-registered PIM address information.

When the PIM request corresponds to a PIM read request for data reading, the Memory Controller 30 may apply a second burst length, which is greater than a first burst length applied to the general memory request for data reading, to the PIM read request, and schedule transmission of the memory request and the PIM request. The Memory Controller 30 may identify whether the PIM request corresponds to the PIM read request using command information included in the PIM request.

When the PIM read request is received, the DRAM 40 identifies the PIM request by comparing the address requested by the memory request with the pre-registered PIM address information.

For example, when a general memory request for data reading is received, the DRAM 40 may read data of a first read granularity corresponding to the first burst length.

In contrast, when the PIM request is received, the DRAM 40 may perform a PIM operation for reading data of a second read granularity corresponding to the second burst length greater than the first read granularity corresponding to the first burst length.

The burst length defines the amount of data transferred on the basis of a single read or write command of the DRAM 40.

The amount of data transferred to or from the CPU 10 may be limited by the cache-line size of the Cache Hierarchy 12. For example, in the case of a Double Data Rate 4 (DDR4) Synchronous DRAM having 64 data pins DQ, and a Cache Hierarchy 12 having a 64-byte cache line size, the number of 64-bit words included in each burst for transmitting data between the DRAM 40 and the Chace Hierarchy 12 may be defined as 8. That is, the burst length may be defined to 8.

The general memory request requires input/output of data to/from the CPU 10, and the amount of data is limited by the cache-line size described above. Therefore, the read and write of the general memory request may be set to have the above-described burst length of 8, that is, the first burst length.

Figure 2:
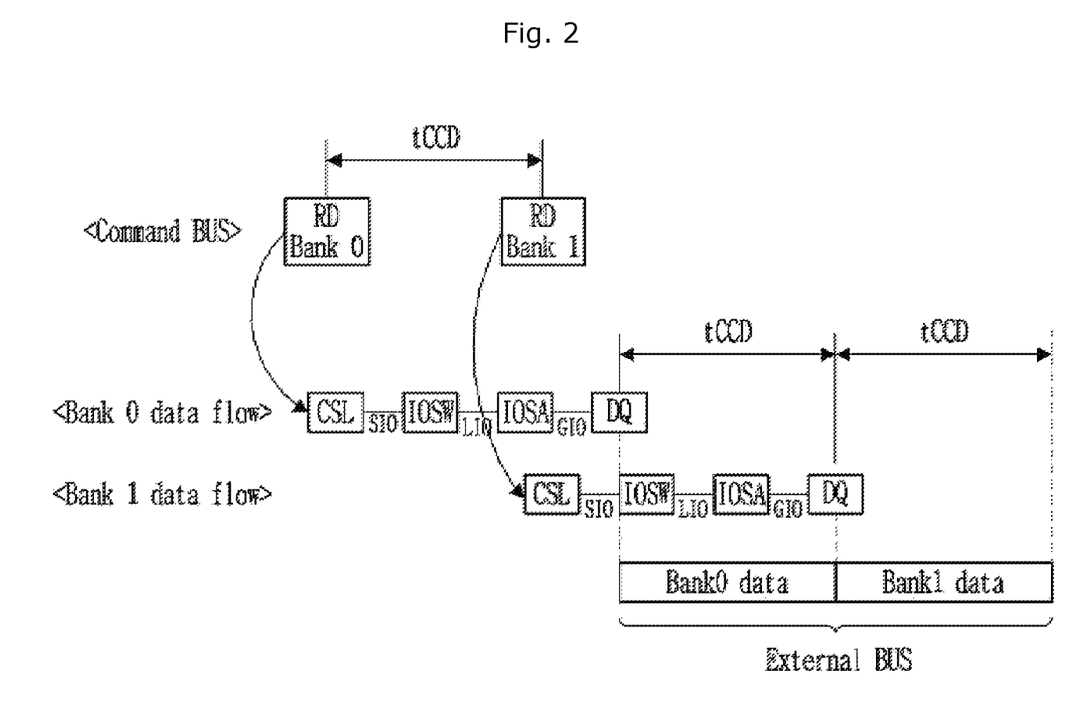
FIG. 2 illustrates a data flow in which a read command is executed by a general memory request.

The operation of the DRAM 40 according to a read command of the general memory request set to have the first burst length by the Memory Controller 30 may be described with reference to FIG. 2.

A memory of the DRAM 40 includes a plurality of banks. For example, the memory may include 16 banks, and the banks may be designated as Bank 0 to Bank 15. Each bank includes memory cells corresponding to a plurality of column addresses and a plurality of row addresses.

A bus to which a command is transmitted is indicated by Command Bus, and a read command corresponding to the general memory request is indicated on the Command Bus by RD. In FIG. 2, RD Bank 0 denotes a read command of a memory request of the Bank and RD Bank 1 denotes a read command of a memory request of the Bank 1.

In response to the read command RD Bank 0 of the memory request, corresponding data in the Bank 0 may be outputted to an External Bus (such as the memory bus MB of FIG. 1) via a column select line (CSL), an input/output switch (IOSW), an input/output sense amplifier (IOSA), and a data output pin (DQ).

The CSL and the IOSW are connected through a cell input/output line (SIO), the IOSW and the IOSA are connected through a local input/output line (LIO), and the IOSA and the DQ are connected through a global input/output line (GIO).

It may be understood that components of a path through which data of a memory cell is read and then is transmitted to the IOSA are provided for each bank and the GIO and the DQ are components shared by all banks.

In the case of a memory request for data reading, read data is outputted through the GIO and the DQ. Therefore, when data of a specific bank is outputted through the GIO and the DQ, the other banks may not access the GIO and the DQ.

Therefore, in order to prevent resource conflicts from occurring for the GIO and the DQ shared by the banks, the Memory Controller 30 schedules memory requests by applying a timing constraint between consecutive read commands.

The timing constraint may be determined according to the burst length.

For example, as described above, the general memory request may have a first burst length of 8. In such a case, and assuming each transfer in a burst transfers 8 bytes, a timing constraint tCCD between the read commands of the memory request may be, for example, set to a time required for transmitting 64 bytes of data from the bank to the external bus External Bus. In such a case, 64 bytes may correspond to the capacity of a cache-line size of a Cache Hierarchy receiving the data.

In the case of the general memory request, the Memory Controller 30 performs scheduling to provide the read command RD Bank 0 to the DRAM 40, and to then provide the read command RD Bank 1 to the DRAM 40 after the timing constraint tCCD corresponding to the first burst length elapses. Accordingly, the DRAM 40 may output data read from the Bank 0 through the GIO and the DQ during a first period corresponding to the timing constraint tCCD, and then output data read from the Bank 1 through the GIO and the DQ during a second period subsequent to the first period and corresponding to the timing constraint tCCD.

The Memory Controller 30 may schedule the memory requests so that the first burst length is applied to consecutive read commands of the same bank of the general memory request and a subsequent read command is performed after the timing constraint tCCD elapses.

The PIM request is for performing a PIM operation inside the DRAM 40. The PIM request will be described with reference to FIG. 3.

Figure 3:
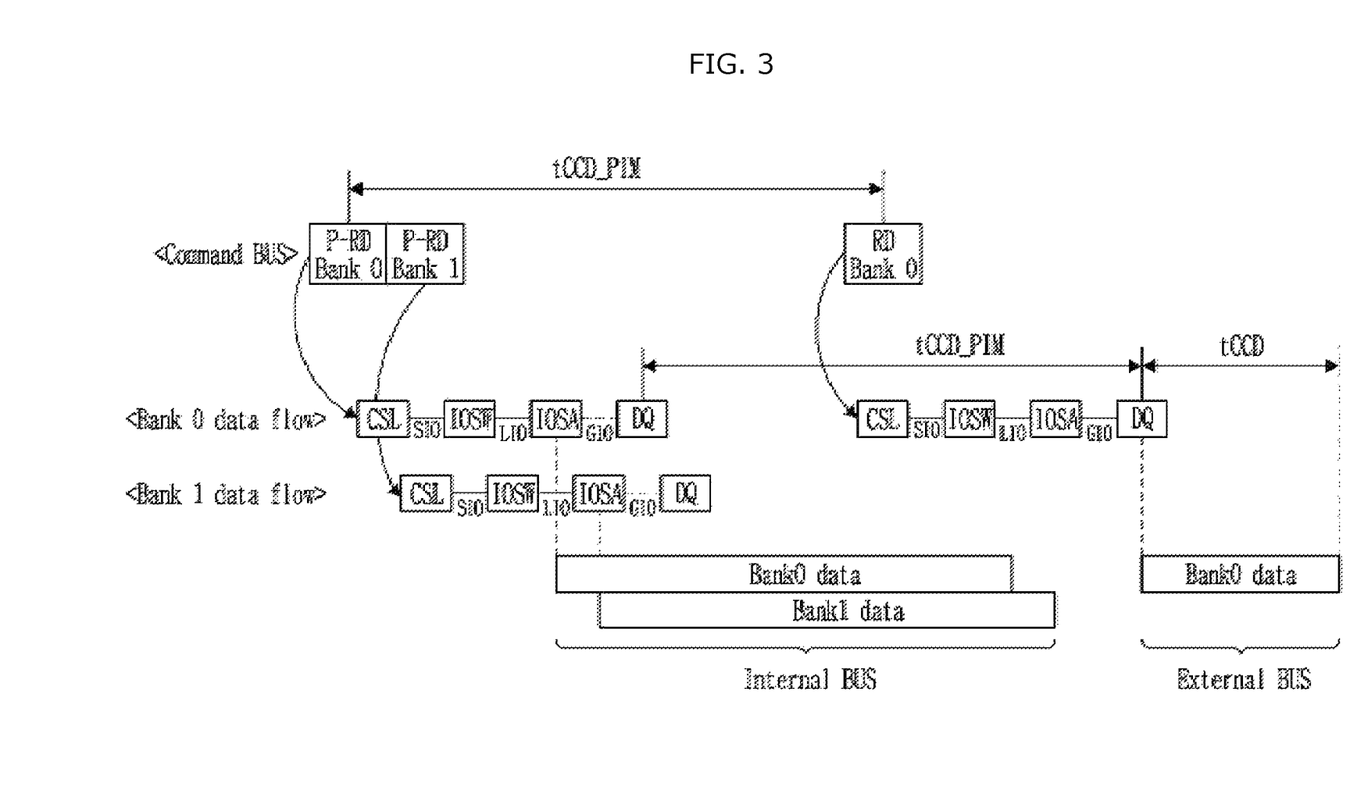
FIG. 3 illustrates a data flow in which a read command is executed by a PIM request.

In FIG. 3, the read command corresponding to the PIM read request is indicated on the Command Bus by P-RD. P-RD Bank 0 indicates a read command of a PIM read request of the Bank 0, and P-RD Bank 1 indicates a read command of a PIM read request of Bank 1. It may be understood that P-RD Bank 0 and P-RD Bank 1 illustrate that PIM read requests may be sequentially provided to different banks.

FIG. 3 illustrates that the read command RD Bank 0 corresponding to a general memory request for a read of Bank 0 is provided after a timing constraint tCCD_PIM elapses from when the read command P-RD Bank 0 of the Bank 0 is provided. It may be understood that P-RD Bank 0 and RD Bank 0 illustrate that read commands corresponding to a general memory request may be provided to different banks after the read command corresponding to a PIM read request.

In the DRAM 40, the PIM operation may be performed for each bank.

Referring to FIG. 3, in response to the read command P-RD Bank 0 by the PIM read request, data of the Bank 0 may be provided to the PIM interface unit 50 for a PIM operation in FIG. 7, which will be described below, through the CSL, the IOSW, and the IOSA. In the case of the PIM read request, read data is not provided to the GIO and the DQ.

As described above, the Bank 0 does not use the GIO and the DQ in response to the PIM read request. Therefore, a different bank may access the GIO and the DQ.

Therefore, the PIM read request of the Bank 0 does not create a need to apply a timing constraint to a subsequent PIM read request or general memory request when the subsequent request is to bank other than Bank 0.

That is, the Memory Controller 30 may sequentially provide the read commands P-RD Bank 0 and P-RD Bank 1 of the PIM request for a different bank without applying the timing constraint, and the DRAM 40 may read data for a PIM operation in the Bank 0 and the Bank 1. Furthermore, the general memory request RD Bank 0 may be provided without applying the timing constraint with respect to P-RD Bank 1, but with applying the timing constraint with respect to P-RD Bank 0, as shown in FIG. 3 and explained in more detail below.

In the PIM operation, the cache-line size does not need to be considered for the above reasons.

Therefore, it is efficient to manage the read granularity for the PIM operation by using an increased amount, which may be based on the size of the page unit which is the memory management unit of the DRAM 40.

The size of one page may be set to 4K bytes, for example. Assuming that the DRAM 40 has 16 banks, each bank may effectively perform a PIM operation of 256 bytes, so that a read from each of the 16 banks corresponds to one page worth of data.

In the case of a memory request of a burst length of 8, 4 memory requests are required to operate 256 bytes of each bank, and 64 memory requests are required to read one page of data distributed into 16 banks.

However, when the read granularity is defined as 256 bytes, it is necessary to provide a request to all banks only once in order to perform an operation on an entire page. In such a case, 16 requests are required. The read granularity is increased by 4 times from 64 bytes, and the second burst length for operating each bank may be set to 32, which is increased by 4 times from the first burst length of 8. That is, the PIM read request may be set to have a second burst length of 32 and a time limit tCCD_PIM may be increased according to the second burst length.

In the case of the PIM request to which the second burst length is applied as described above, a PIM request is required once for each bank in order to perform an operation on the entirety of one page, and as a result, memory traffic for the request may be reduced and the PIM operation may be more efficiently performed.

The PIM operation does not need to transmit data to the Memory Controller 30. Therefore, even though the read granularity is increased, no resource conflict occurs between PIM read requests of different banks. Therefore, the PIM read request does not need to apply a timing constraint considering PIM requests or general memory requests of different banks.

However, the PIM read requests of the same bank may share at least some components of a path through which data of a memory cell is read and then transmitted to the IOSA. Therefore, in the case of the PIM read request of a bank, the PIM read request creates a need to apply the timing constraint tCCD_PIM determined according to the second burst length (in this example, 32) when scheduling a subsequent PIM request or general memory request to that bank.

This will be described in detail with reference to FIG. 3. FIG. 3 illustrates an example in which after the timing constraint tCCD_PIM elapses on the basis of the time when the read command P-RD Bank 0 of the Bank 0 is provided, the read command RD Bank 0 of the Bank 0 by the memory request is provided. It may be understood that P-RD Bank 0 and RD Bank 0 illustrate that a read command by a general memory request may be provided to a same bank after a read command of a PIM read request.

As in the P-RD Bank 0 and the RD Bank 0, when a PIM request or a general memory request subsequent to an earlier PIM read request is provided that uses the same bank as the earlier PIM read request, the Memory Controller 30 may perform scheduling by applying the timing constraint tCCD_PIM considering the second burst length of 32 to the PIM read request.

In an embodiment of the present disclosure, the burst length of the DRAM 40 increases as the read granularity for the PIM operation increases, and thus the Memory Controller 30 may perform scheduling by increasing the timing constraint tCCD_PIM.

An embodiment of the present disclosure may be configured so that the Memory Controller 30 schedules the PIM request and the general memory request to have different timing constraints as described above.

In embodiments of the present disclosure, the Memory Controller 30 may set the PIM read request to have the second burst length greater than the first burst length.

The above-described second burst length may be determined according to a size of pages of the DRAM 40 and may be set to have a value increased to a multiple of the first burst length.

More specifically, in the embodiment of the present disclosure, the burst length may be adjusted to a multiple of 8, 16, 32 . . . or the like. Therefore, the timing constraint may also be increased to a multiple of the timing constraint tCCD for the first burst length, that is, tCCD, tCCD*2, tCCD*3 . . . tCCD*N. In the embodiment of the present disclosure, it may be understood that the timing constraint tCCD_PIM for the second burst length corresponds to tCCD*4.

Figure 4:
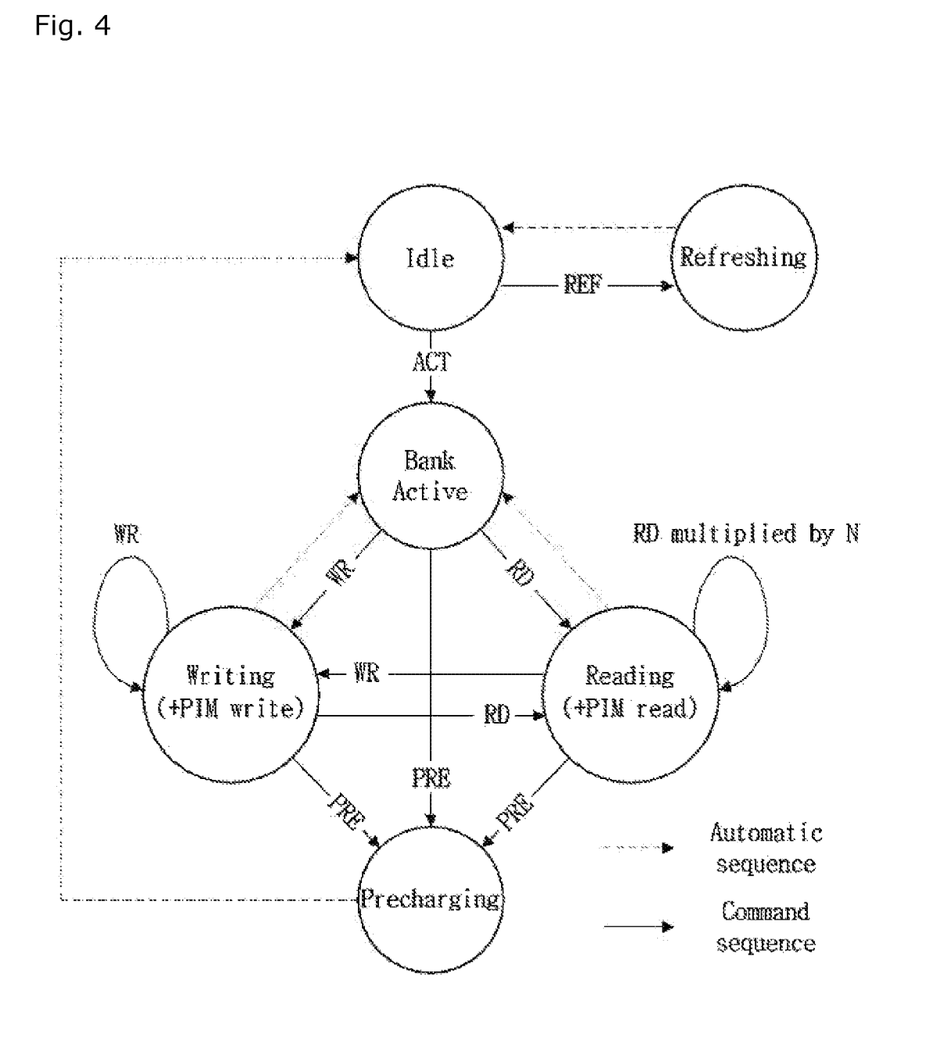
FIG. 4 illustrates an extended DRAM state diagram.

FIG. 4 is a diagram for explaining a DRAM state diagram extended according to an embodiment of the present disclosure.

Referring to FIG. 4, it can be seen that the embodiment of the present disclosure maintains a general DRAM state diagram as is and a transition to the same PIM read state occurs for a PIM read request. It may be understood that the transition repeated in the same state has the same meaning as an increase in the burst length.

Figure 5:
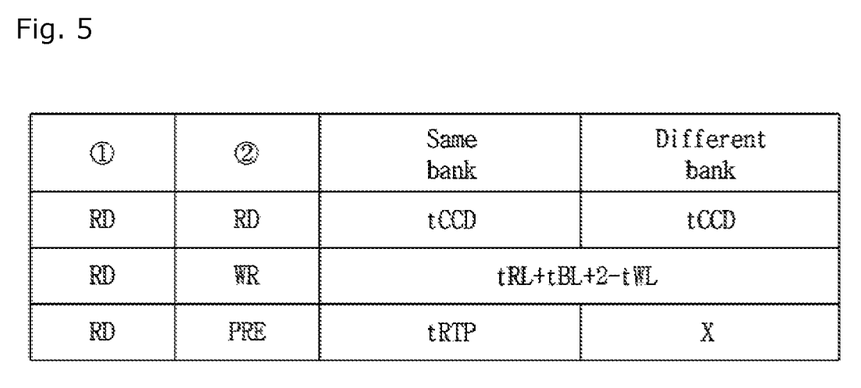
FIG. 5 is a table illustrating a timing constraint applied in response to a memory read request.

FIG. 5 is a table illustrating a timing constraint applied to a general memory request for data reading. In FIG. 5, ① and ② are for indicating the sequence of commands.

When general memory requests RD for reading are consecutive in the same bank or different banks, the Memory Controller 30 applies the timing constraint tCCD to the memory request of ① in order to prevent resource conflict between the GIO and the DQ.

When a memory request RD for reading and a memory request WR for writing are consecutive in the same bank or different banks, the Memory Controller 30 applies a preset timing constraint for transition from read to write to the memory request RD for reading. The preset timing constraint for transition from read to write may be determined using a read latency tRL, a burst length tBL, and a write latency tWL. For example, the timing constraint may be determined as tRL+tBL+2-tWL.

When the memory request RD for reading and a memory request PRE for precharge are consecutive in the same bank, the Memory Controller 30 applies a preset timing constraint tRTP for transition from read to precharge. On the other hand, when the memory request RD for reading and the memory request PRE for precharge are consecutive in different banks, the Memory Controller 30 does not need to consider a timing constraint for the memory request for reading.

Figure 6:
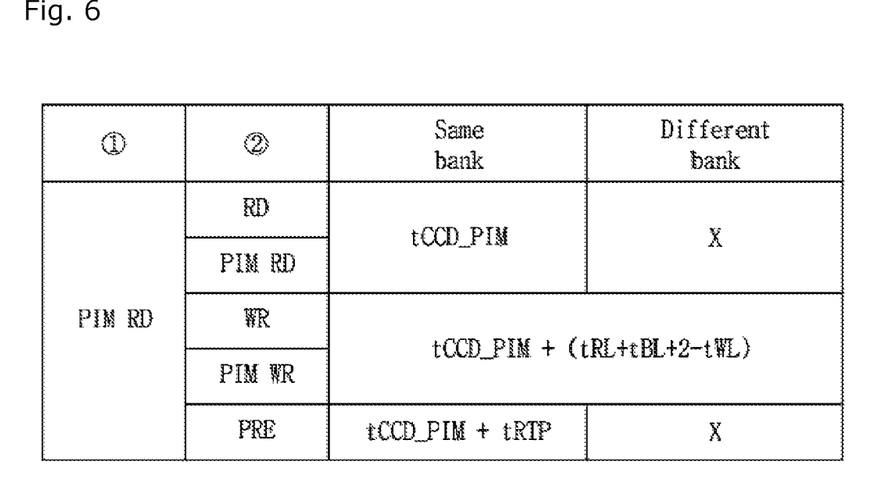
FIG. 6 is a table illustrating a timing constraint applied in response to a PIM read request.

FIG. 6 is a table illustrating a timing constraint applied to a PIM read request.

After a PIM read request PIM RD, when the PIM read request PIM RD or a memory request RD for data reading of the same bank is consecutive, the Memory Controller 30 may transmit the PIM read request PIM RD or the memory request RD for data reading which is consecutive after the elapse of a timing constraint tCCD_PIM determined according to the second burst length of the previous PIM read request PIM RD.

After the PIM read request PIM RD, when the PIM read request PIM RD or the memory request RD for data reading of a different bank is consecutive, the Memory Controller 30 does not need to apply the timing constraint of the previous PIM read request PIM RD.

After the PIM read request PIM RD, when a PIM request PIM WR or a memory request WR for data writing of the same or a different bank is consecutive, the Memory Controller 30 may transmit the PIM request PIM WR or memory request WR for data writing after the elapse of a timing constraint tCCD_PIM to which the second burst length of the PIM read request PIM is applied and a preset timing constraint for transition from read to write. The preset timing constraint for transition from read to write may be determined using a read latency tRL, a burst length tBL, and a write latency tWL. For example, the timing constraint may be determined as tRL+tBL+2-tWL.

After the PIM read request PIM RD, when a memory request PRE for precharge of a different bank is consecutive, the Memory Controller 30 may transmit a PIM request or a memory request regardless of the timing constraint tCCD_PIM to which the second burst length of the PIM read request is applied.

After the PIM read request RD, when the memory request PRE for precharge of the same bank is consecutive, the Memory Controller may transmit the memory request PRE for precharge after the elapse of the timing constraint tCCD_PIM to which the second burst length of the PIM read request PIM_RD is applied and a preset timing constraint tRTP for transition from read to precharge.

Detailed configurations of the Memory Controller 30 and the DRAM 40 may be described with reference to FIG. 7.

The Memory Controller 30 includes a Data Queue Unit 32, a PIM Interface Unit 34, a Request Queue Unit 36, and a Scheduler 38.

The Memory Controller 30 is configured to receive a memory request and transfer read or write data corresponding to the memory request. The memory request may be expressed as a read or write transaction, and it may be understood that the memory request includes address information and command information.

The Data Queue Unit 32 may be configured to receive, store, and output data in a FIFO manner, and may perform data transmission between the MB and the DRAM 40.

The PIM Interface Unit 34 is configured to receive address information and command information of the memory request.

The PIM Interface Unit 34 may be configured to register PIM address information for identifying a PIM request, to compare an address requested by a memory request received from outside of the Memory Controller 30 with the PIM address information, and to provide a PIM request identification signal obtained by identifying whether the memory request corresponds to the PIM request.

The PIM address information for identifying the PIM request, which is registered in the PIM Interface Unit 34, may be pre-registered by the CPU 10 of FIG. 1.

Burst length information for each PIM operand of the PIM request may be set in the PIM Interface Unit 34, and the PIM Interface Unit 34 may be configured to provide the Scheduler 38 with burst length information corresponding to the PIM operand of the PIM request.

The Request Queue Unit 36 may be configured to, in a FIFO manner, receive, store, and output the memory request received from the outside and the PIM request identification signal provided by the PIM Interface Unit 34. That is, the Request Queue Unit 36 may be configured to transmit the memory request and the PIM request identification signal.

The Scheduler 38 may receive the memory request, the PIM request identification signal, and the burst length information corresponding to the PIM operand, and may be configured to schedule the transmission of the memory request and the PIM request.

More specifically, the Scheduler 38 may be configured to apply the first burst length to a general memory request for data reading, to apply the second burst length greater than the first burst length to a PIM read request for a read command when the PIM request is identified by the PIM request identification signal as the PIM read request, and to schedule the transmission of the memory request and the PIM request using the applied burst lengths.

Figure 7:
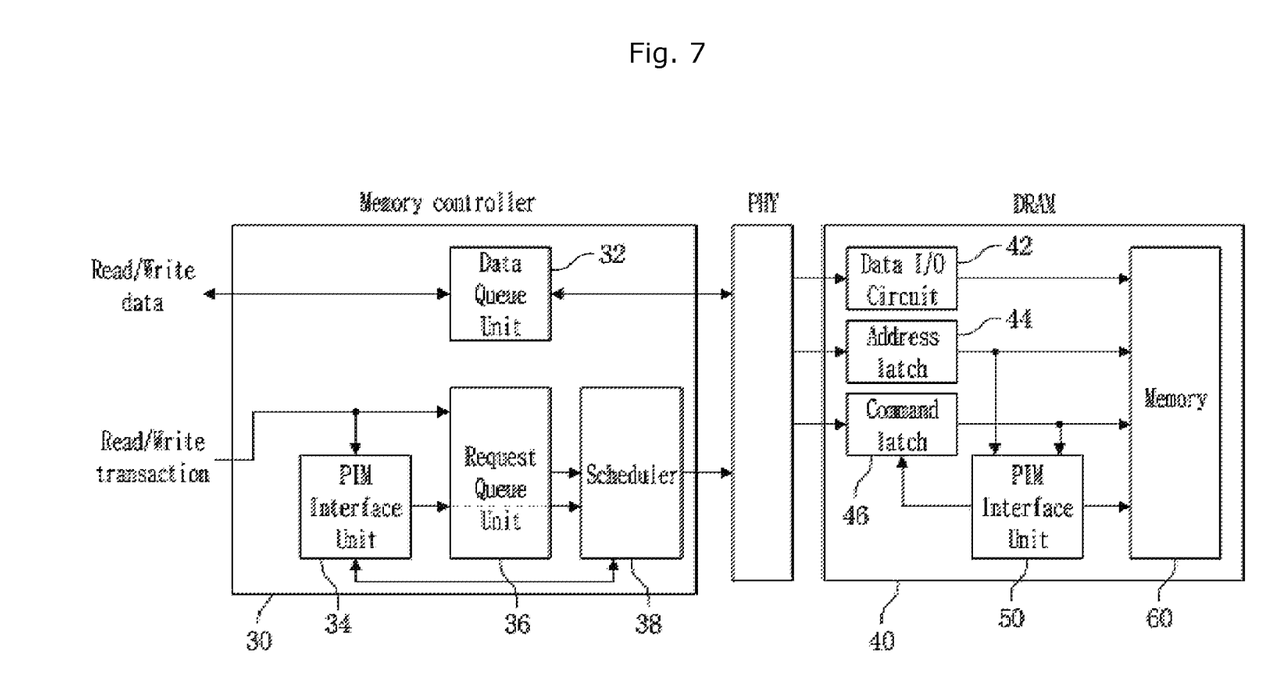
FIG. 7 is a detailed block diagram of a Memory Controller and a DRAM according to an embodiment.

The Memory Controller 30 and the DRAM 40 are interfaced through buses for transmitting the data, the address information, and the command information, and in FIG. 7, the above-described buses are represented by an interface PHY.

The DRAM 40 may receive the command information and the address information through the interface PHY, and may transmit and receive the data through the interface PHY.

The DRAM 40 may include a Data Input/Output (I/O) Circuit 42, an Address latch 44, a Command latch 46, a PIM Interface Unit 50, and a Memory 60.

The memory request and the PIM request are configured to include the address information and the command information. Therefore, the memory request and the PIM request may be received by the Address latch 44 and the Command latch 46.

The Data I/O Circuit 42 may be configured to input or output the data according to the general memory request or the PIM request.

The Address latch 44 may be configured to receive, temporarily store, and then output address information Addr provided through the Memory Controller 30. The address information Addr may include a bank address BAddr, a column address CAddr, and a row address RAddr.

The Command latch 46 may be configured to receive, temporarily store, and then output the command information provided through the interface PHY, and provide command information CMD on a PIM operation to the PIM Interface Unit 50 to be described below. The command information may indicate Bank Active, Read, Write, Precharge, and the like.

The Memory 60 is configured to have a plurality of memory banks for storing data, and it may be understood that each of the memory banks includes memory cells having a predetermined storage capacity.

The PIM Interface Unit 50 may be configured to receive address information and command information corresponding to the PIM request, to identify the PIM request by using the address information and the command information, and to perform a PIM operation using the Memory 60 in response to the PIM request.

The PIM Interface Unit 50 may also register the PIM address information for identifying the PIM request, and identify the PIM request by comparing address information of a request received from the outside with the registered PIM address information. It may be understood that the PIM address information for identifying the PIM request, which is registered in the PIM Interface Unit 50, is pre-registered in the PIM Interface Unit 50 by the CPU 10.

As described above, the PIM Interface Units 34 and 50 may be configured in each of the Memory Controller 30 and the DRAM 40, respectively, in order to identify whether the memory request corresponds to the PIM request.

Figure 8:
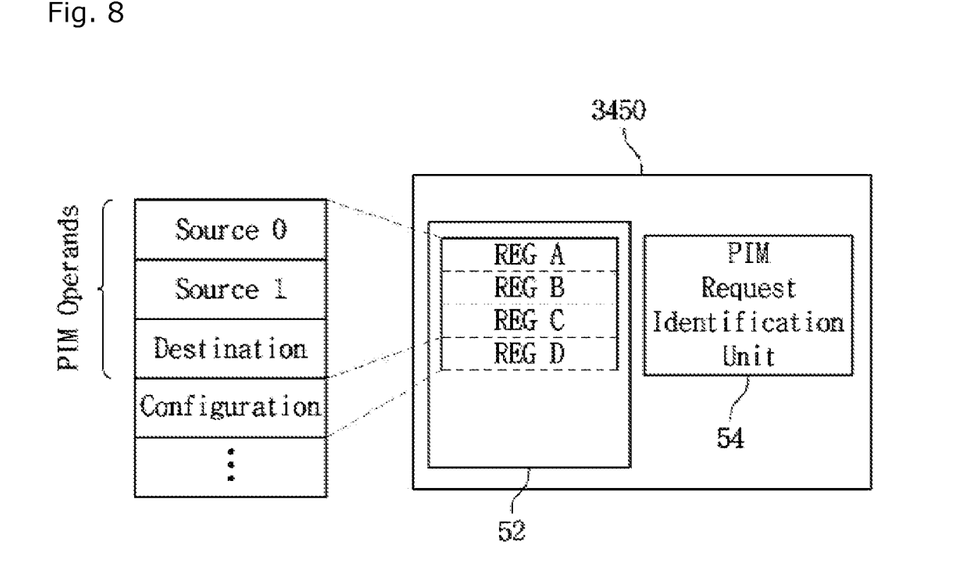
FIG. 8 is a block diagram of PIM interface units in FIG. 7 according to an embodiment.

In order to identify whether the memory request corresponds to the PIM request, the PIM Interface Units 34 and 50 of the Memory Controller 30 and the DRAM 40, respectively, may be configured with a general structure illustrated in the PIM Interface Unit 3450 of FIG. 8.

FIG. 8 illustrates that the PIM Interface Unit 3450 includes a control register set 52 and a PIM Request Identification Unit 54.

When implemented in the Memory Controller 30, the PIM Interface Unit 3450 may be configured to provide a PIM request identification signal obtained by identifying whether the memory request corresponds to the PIM request. In such a case, the PIM Interface Unit 34 may be configured to identify the PIM request by using an address information value itself without distinction of banks, columns, and rows, and to provide the PIM request identification signal and burst length information of an operand corresponding to the PIM request.

When implemented in the DRAM 40, the PIM Interface Unit 3450 may be configured to provide a PIM command identification signal obtained by identifying the PIM request by using the address information and the command information.

The control register set 52 may be configured in the PIM Interface Unit 3450 to have the same structure when in implemented in either of the Memory Controller 30 and the DRAM 40, and may include a plurality of registers including address information of PIM operands for a PIM operation, valid information of the PIM operands, and burst length information for each of the PIM operands.

In the control register set 52, registers REG A and REG B store source address information, and a register REG C stores destination address information for storing an operation result. The source address information and the destination address information correspond to address information of PIM operands, that is, PIM address information.

A register REG D stores configuration information, and the configuration information may include information related to an attribute of the operand, validity information of the operand, and burst length information constituting a burst length for each operand.

Although the PIM Request Identification Units 54 of the Memory Controller 30 and the DRAM 40 have a common function of identifying whether an address requested by a memory request received from the outside corresponds to PIM address information, there is a difference in a specific identification method therebetween. Therefore, depending on the difference in the above identification method, the PIM Request Identification Unit 54 of the Memory Controller 30 may be configured as illustrated in FIG. 9 and the PIM Request Identification Unit 54 of the DRAM 40 is configured as illustrated in FIG. 10.

First, when the address requested by the memory request received from the outside corresponds to the PIM address information registered in the control register set 52, the operand corresponding to the PIM address information is valid, and the memory request corresponds to a read command or a write command, the PIM Request Identification Unit 54A of the Memory Controller 30 is configured to provide the PIM request identification signal obtained by identifying the PIM request.

Figure 9:
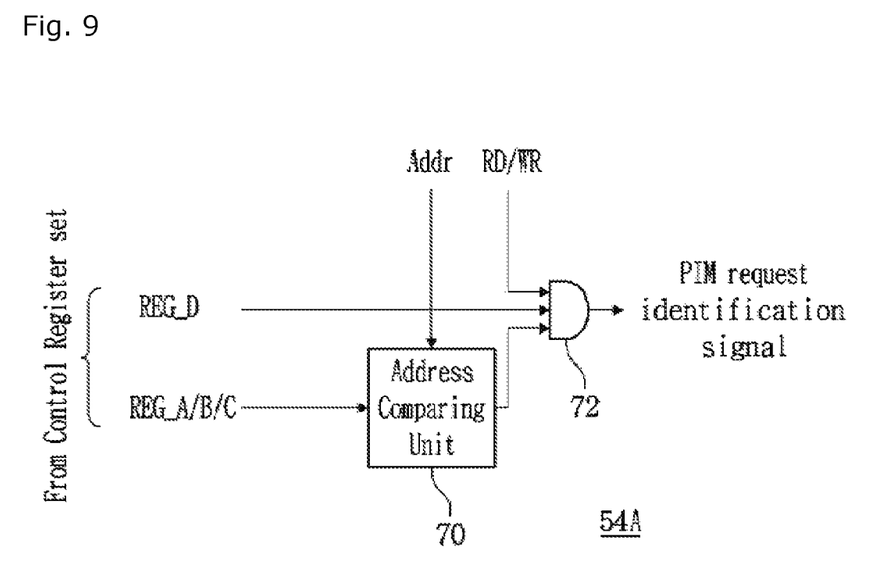
FIG. 9 is a block diagram of a PIM Request Identification Unit included in a PIM Interface Unit of FIG. 8.
Figure 10:
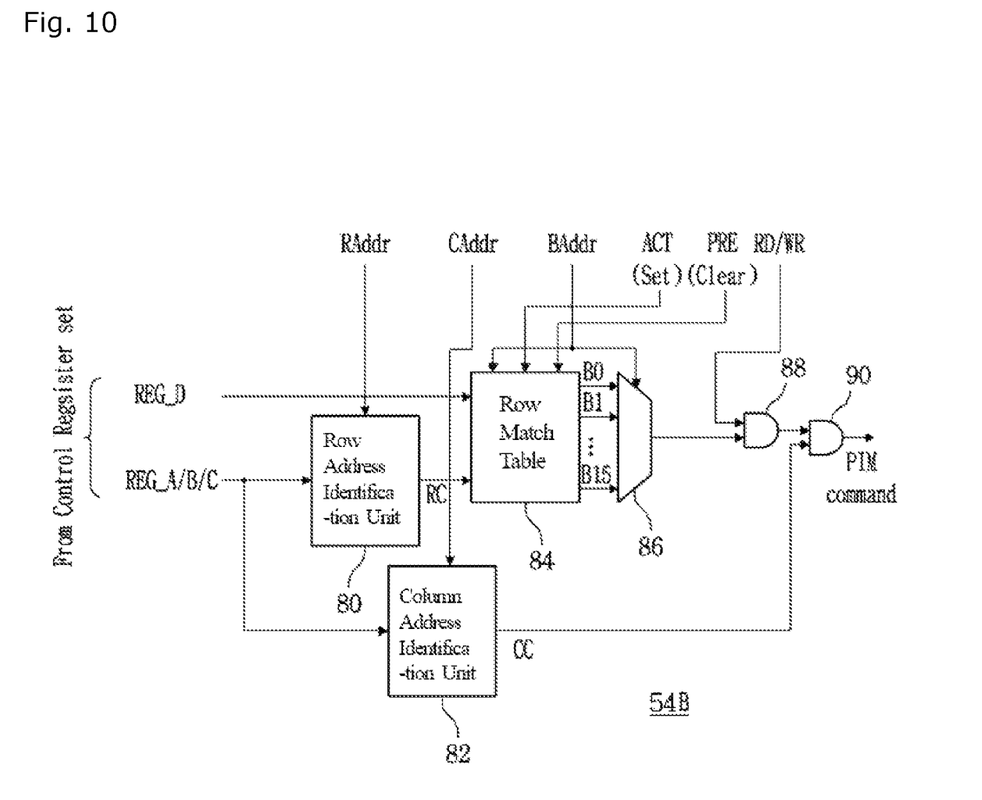
FIG. 10 is a block diagram of a PIM Request Identification Unit included in a PIM Interface Unit of FIG. 8.

Referring to FIG. 9, the PIM Request Identification Unit 54A of the Memory Controller 30 may include an address comparing unit Address Comparing Unit 70 and an AND gate 72.

The Address Comparing Unit 70 may be configured to compare the PIM address information REG A/B/C stored in the control register set 52 with address information Addr requested by the memory request, and to provide the AND gate 72 with a result indicating whether the PIM address information REG A/B/C matches the address information Addr. The Address Comparing Unit 70 may be configured to compare the PIM address information REG A/B/C with the address information Addr requested by the memory request, by an address information value itself without distinction of banks, columns, and rows.

The AND gate 72 may be configured to use the output of the Address Comparing Unit 70, information from the register REG D regarding whether the operand corresponding to the PIM address information is valid, and read/write information RD/WR regarding whether the memory request corresponds to a read command or a write command to provide the PIM request identification signal. When the output of the Address Comparing Unit 70 indicates that the address requested by the memory request received from outside the Memory Controller 30 corresponds to the PIM address information, the information from the register REG D indicates that the operand corresponding to the PIM address information is valid, and read/write information RD/WR indicates that the memory request corresponds to the read command or the write command, the AND gate 72 may provide an activated PIM request identification signal to indicate that a PIM request has been received.

When the PIM Request Identification Unit 54A provides the activated PIM request identification signal, the Scheduler 38 identifies that the current memory request corresponds to the PIM request and schedules the PIM request by applying the second burst length. When the PIM Request Identification Unit 54A provides a deactivated PIM request identification signal, the Scheduler 38 identifies that the current memory request does not correspond to the PIM request and schedules the current memory request by applying the first burst length.

The PIM Request Identification Unit 54B of the DRAM 40 may be configured to set a matching flag for a corresponding bank address when a row address requested by the memory request and the PIM request corresponds to row address information of the PIM address information and the operand corresponding to the PIM address information is valid, to activate a matching flag for a selected bank in the case of a read command or a write command, and to provide the activated matching flag as a PIM command identification signal when a column address requested by the memory request and the PIM request corresponds to column address information of the PIM address information.

Referring to FIG. 10, the PIM Request Identification Unit 54B of the DRAM 40 may include a Row Address identification unit 80, a Column Address identification unit 82, a Row Match Table 84, a multiplexer 86, a row match identification unit 88, and a command identification unit 90.

The Row Address identification unit 80 may be configured to provide a first identification signal RC obtained by identifying whether a row address RAddr requested by a general memory request or PIM request corresponds to row address information of the PIM address information REG A/B/C stored in the control register set 52.

The Row Match Table 84 may be configured to identify whether the operand is valid by referring to the information of the register REG D regarding whether the operand corresponding to the PIM address information is valid, to set a matching flag for the corresponding bank address BAddr indicated by the first identification signal RC when the operand is valid, and to set and store a matching flag indicated by active command information ACT or to deactivate (clear) a matching flag indicated by precharge command information PRE.

As described above, the Row Match Table 84 may provide an activated or deactivated matching flag for each of the banks B0 to B15.

The multiplexer 86 may be configured to receive the bank address BAddr and output the matching flag corresponding to the bank address.

The row match identification unit 88 may be configured to receive a read/write command RD/WR indicating a data transfer operation, to receive the matching flag provided from the multiplexer 86, and to output a second identification signal corresponding to the matching flag output from the multiplexer 86 when the read/write command RD/WR is in an activated state.

The Column Address identification unit 82 may be configured to provide a third identification signal CC obtained by identifying whether a column address requested by the general memory request or PIM request corresponds to column address information of the PIM address information REG A/B/C stored in the control register set 52.

The command identification unit 90 may be configured to provide the PIM command identification signal PIM command when the second identification signal of the row match identification unit 88 and the third identification signal of the Column Address identification unit 82 are both activated.

When the PIM Request Identification Unit 54B provides the PIM command identification signal PIM command in an activated state, the PIM Interface Unit 50 of the DRAM 40 may perform a PIM operation corresponding to the PIM request by using the memory 60.

Accordingly, the present disclosure can provide a scheduling scheme capable of simultaneously supporting the general memory request and the PIM request.

Furthermore, the present disclosure can increase a timing constraint and a read granularity for the PIM request, relative to the general memory request, without modifying a state diagram of the DRAM and without increasing the number of bus lines between the Memory Controller 30 and the DRAM 40.

The present disclosure can improve the efficiency of a PIM operation while improving memory traffic for the PIM request by increasing a burst length for the PIM request.

The present disclosure can variously configure a burst length with respect to the PIM request and thus have scalability for use in various specifications of DRAMs and operating systems.

What is claimed is:

1. A Processing-in-Memory (PIM) computing system comprising:
   a Random Access Memory (RAM) configured to perform a PIM operation of reading data of a second read granularity corresponding to a second burst length in response to receiving a PIM request when the PIM request includes a read command; and
   a memory controller configured to:
      identify a first memory request as the PIM request by comparing an address of the first memory request with pre-registered PIM address information,
      schedule a memory request by applying the second burst length greater than a first burst length when the first memory request is identified as the PIM request,
      schedule the memory request by applying the first burst length when the first memory request is not identified as the PIM request, and
      provide the first memory request to the RAM.

2. The PIM computing system of claim 1, wherein the first burst length corresponds to a cache-line size on an external path for transmitting data, and the second burst length corresponds to a size of pages used for managing a memory of the DRAM.

3. The PIM computing system of claim 2, wherein the second burst length is an integer multiple of the first burst length.

4. The PIM computing system of claim 1, wherein when the first memory request is identified as the PIM request, the memory controller is further configured to:
   receive the second memory request consecutive to the first memory request, the second memory request including a request to read data from a first bank of the RAM;
   when the PIM request includes the read command and a request to read data from the first bank, providing the second memory request to the RAM after a timing constraint has elapsed, the timing constraint corresponding to the second burst length elapses from the providing of the first memory request to the RAM.

5. The PIM computing system of claim 1, wherein the memory controller is further configured to, when the first memory request is identified as the PIM request and includes the read command:
   receive the second memory request consecutive to the first memory request;
   when the PIM request includes a request to read data from a first bank of the RAM and the second memory request includes a request for data reading or precharge of a second bank of the RAM different from the first bank, providing the second memory request to the RAM regardless of a timing constraint corresponding to the second burst length applied by the first memory request.

6. The PIM computing system of claim 1, wherein the memory controller is further configured to, when the first memory request is identified as the PIM request and includes the read command:
   receive the second memory request consecutive to the first memory request;
   when the PIM request includes a request to read data from a first bank and the second memory request includes a request for data writing of the first bank or of a second bank of the RAM different from the first bank, provide the memory request to the RAM after a timing constraint has elapsed, the timing constraint corresponding to the second burst length applied by the PIM request and a preset timing constraint for transition from read to write.

7. The PIM computing system of claim 1, wherein the memory controller is further configured to, when the first memory request is identified as the PIM request and includes the read command:
   receive the second memory request consecutive to the first memory request;
   when the PIM request includes a request to read data from a first bank and the second memory request includes a request for precharge of the first bank, provide the second memory request to the RAM after a timing constraint has elapsed, the timing constraint corresponding to the second burst length applied by the PIM request and a preset timing constraint for transition from read to precharge.

8. The PIM computing system of claim 1, wherein the memory controller comprises:
   a PIM interface unit configured to register PIM address information for identifying the PIM request, to compare an address requested by a memory request received from the outside of the memory controller with the PIM address information, and to provide a PIM request identification signal obtained by identifying whether the memory request corresponds to the PIM request;
   a request queue unit configured to transmit the memory request received from the outside of the memory controller and the PIM request identification signal; and
   a scheduler configured to apply the first burst length to the memory request when the first memory request is a general memory request for reading data, to apply the second burst length when the first memory request is identified by the PIM request identification signal as the PIM request and the PIM request includes the read command, and to schedule transmission of the memory request using the applied burst length.

9. The PIM computing system of claim 8, wherein the PIM interface unit comprises:
   a control register set configured to register the PIM address information of PIM operands for the PIM operation; and
   a PIM request identification unit configured to provide the PIM request identification signal obtained by identifying the PIM request when the address requested by the memory request received from the outside corresponds to the PIM address information.

10. The PIM computing system of claim 9, wherein the control register set further includes burst length information for each of the PIM operands, wherein the PIM interface unit provides the scheduler with the burst length information of the PIM operand corresponding to the PIM request, and wherein the scheduler applies the corresponding burst length information to the PIM request corresponding to the PIM request identification signal.

11. The PIM computing system of claim 8, wherein the PIM interface unit comprises:

a control register set including the PIM address information of PIM operands for the PIM operation and valid information of the PIM operands; and a PIM request identification unit configured to provide the PIM request identification signal obtained by identifying the PIM request when the address requested by the memory request received from the outside corresponds to the PIM address information, the PIM operand corresponding to the PIM address information is valid, and the memory request corresponds to a read command or a write command.

12. The PIM computing system of claim 1, wherein the RAM comprises:

an address latch configured to store address information in response to the memory request and the PIM request;

a command latch configured to store command information in response to the memory request and the PIM request;

a memory configured to store the data; and a PIM interface unit configured to receive the address information and the command information corresponding to the PIM request, to identify the PIM request using the address information and the command information, and to perform the PIM operation using the memory in response to the PIM request.

13. The PIM computing system of claim 12, wherein the PIM interface unit comprises:

a control register set including the PIM address information of PIM operands for the PIM operation and valid information of the PIM operands; and a PIM request identification unit configured to set a first matching flag for a corresponding bank address when a row address requested by the memory request and the PIM request corresponds to row address information of the PIM address information and the operand corresponding to the PIM address information is valid, to activate a second matching flag for a selected bank in a case of a read command or a write command, and to provide the activated second matching flag as a PIM command identification signal when a column address requested by the memory request and the PIM request corresponds to column address information of the PIM address information, wherein the PIM interface unit performs the PIM operation corresponding to the PIM request by using the memory and the PIM command identification signal.

14. The PIM computing system of claim 13, wherein the PIM request identification unit comprises:

a row address identification unit configured to provide a first identification signal obtained by identifying whether a row address requested by the memory request and the PIM request corresponds to row address information of the PIM address information;

a row match table configured to set the matching flag for the corresponding bank address using the first identification signal when the operand is valid, to activate the matching flag in response to active command information, and to deactivate the matching flag in response to precharge command information;

a multiplexer configured to output the matching flag corresponding to the bank address;

a row match identification unit configured to output a second identification signal corresponding to the matching flag output from the multiplexer when a read command or a write command is in an activated state;

a column address identification unit configured to provide a third identification signal obtained by identifying whether a column address requested by the memory request and the PIM request corresponds to column address information of the PIM address information; and a command identification unit configured to provide the PIM command identification signal when the second identification signal and the third identification signal are activated.

15. A memory controller of a PIM computing system, the memory controller comprising:

a PIM interface unit configured to receive a memory request and to provide a PIM request identification signal identifying whether the memory request corresponds to a PIM request by comparing an address requested by the memory request with pre-registered PIM address information;

a request queue unit configured to receive the memory request, and to transmit the memory request and the PIM request identification signal; and a scheduler configured to apply a second burst length when the PIM request identification signal indicates that the memory request is the PIM request and the PIM request is a PIM read request, to apply a first burst length when the PIM request identification signal indicates that the memory request is not the PIM request, and to schedule transmission of the memory request to a Random Access Memory (RAM), wherein the second burst length is greater than the first burst length.

16. The memory controller of claim 15, wherein the PIM interface unit comprises:

a control register set including the PIM address information of PIM operands for a PIM operation and valid information of the PIM operands; and a PIM request identification unit configured to provide the PIM request identification signal obtained by identifying the PIM request when the address requested by the memory request corresponds to the PIM address information, the PIM operand corresponding to the PIM address information is valid, and the memory request corresponds to a read command or a write command.

17. The memory controller of claim 16, wherein the control register set further includes burst length information for each of the PIM operands, the PIM interface unit provides the scheduler with the burst length information of the PIM operand corresponding to the PIM request, and the scheduler applies the corresponding burst length information to the PIM request corresponding to the PIM request identification signal to determine the second burst length.

18. The memory controller of claim 15, wherein the second burst length corresponds to a size of pages of the RAM and is an integer multiple of the first burst length.

19. The memory controller of claim 15, wherein the scheduler is further configured to:

when the memory request is the PIM request and requests data from a first bank of the RAM, schedule a subsequent consecutive memory request for reading data of the first bank for transmission to the RAM after a timing constraint has elapsed, the timing constraint corresponding to the second burst length applied in response to the PIM request.

20. The memory controller of claim 15, wherein the scheduler is further configured to:
when the memory request is the PIM request and requests data from a first bank of the RAM, schedule a subsequent consecutive memory request for data reading or precharge of a second bank of the RAM different from the first bank for transmission to the RAM regardless of a timing constraint corresponding to the second burst length applied in response to the PIM read request.

21. The memory controller of claim 15, wherein the scheduler is further configured to:
when the memory request is the PIM request and requests data from a first bank of the RAM, schedule a subsequent consecutive memory request for data writing of the first bank or a bank of the RAM different from the first bank for transmission to the RAM after a timing constraint has elapsed, the timing constraint corresponding to which the second burst length applied in response to the PIM request and a preset timing constraint for transition from read to write.

22. The memory controller of claim 15, wherein the scheduler is further configured to:
when the memory request is the PIM request and requests data from a first bank of the RAM, schedule a subsequent consecutive memory request for precharge of the first bank for transmission to the RAM after a timing constraint has elapsed, the timing constraint corresponding to the second burst length applied in response to the PIM request and a preset timing constraint for transition from read to precharge.

\* \* \* \* \*